May 21, 1963
C. F. GORMAN
3,090,871
BATTERY CHARGING SYSTEM
Filed May 2, 1962
2 Sheets-Sheet 1
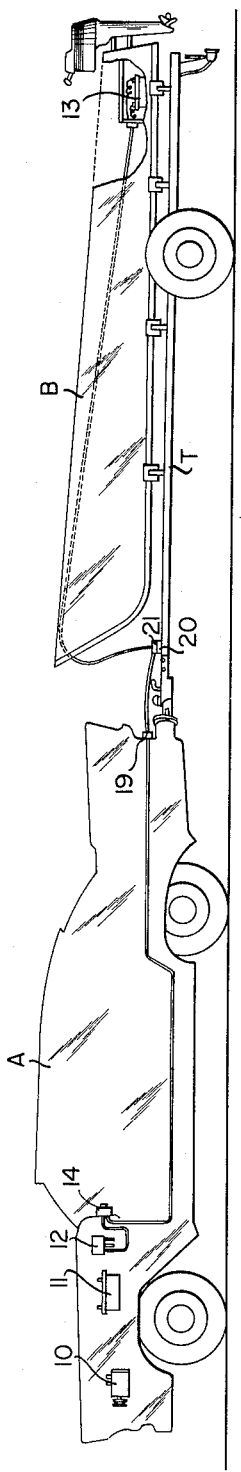
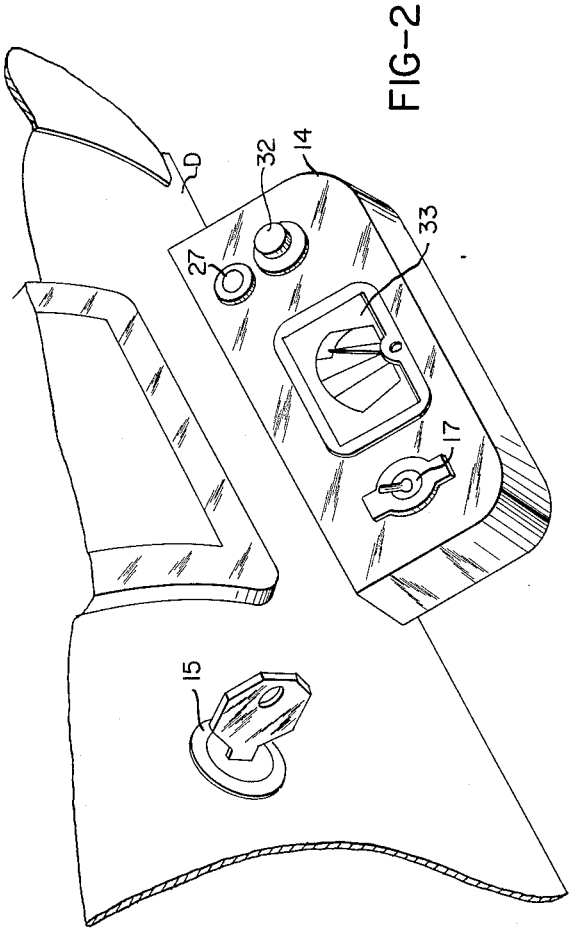
INVENTOR.
CHARLES F. GORMAN
BY MAHONEY, MILLER & RAMBO
ATTORNEYS

*INVENTOR.*
CHARLES F. GORMAN
MAHONEY, MILLER & RAMBO
BY
ATTORNEYS

United States Patent Office 3,090,871
Patented May 21, 1963

3,090,871
BATTERY CHARGING SYSTEM
Charles F. Gorman, Box 6, Monroe, Ohio
Filed May 2, 1962, Ser. No. 191,989
3 Claims. (Cl. 307—10)

My invention relates to a battery charging system. It relates, more specifically, to a system whereby the battery of a boat, carried by a trailer being towed along by an automobile, truck or similar vehicle, can be charged by the generator and charging system of the towing vehicle.

This application is a continuation-in-part of my co-pending application, Serial Number 4,325, filed January 25, 1960, relating to a battery charging system.

As is well known, it is common to haul boats from place to place on trailers towed by automotive vehicles. The boats usually include an electrical system having a wet-cell storage battery as a source of power. In many of the boats, however, the electrical system does not include a battery charging apparatus. Operation of the boat will consequently discharge the battery and, after prolonged use, necessitate recharging of the battery for continued satisfactory operation. The boat battery is usually of sufficient capacity to operate the electrical system of the boat for an outing but it should be recharged before a subsequent use. It would be ideal if the charging could be accomplished while the boat is being towed to a different location. The towing vehicle is an ideal source of power for charging the boat battery as it is provided with a charging system for its own battery. The generator of the vehicle's charging system is usually of sufficient capacity to maintain a satisfactory charge on the battery of the towing vehicle and to recharge a boat battery.

It is, therefore, the primary object of my invention to provide a battery charging system for the battery of a boat carried by a trailer towed by a vehicle that utilizes the charging system of the vehicle as a power source.

It is another object of my invention to provide a battery charging system for a boat battery having a charging circuit and a voltage measuring circuit including an electrical indicating meter to determine the charged condition of either the boat battery or the towing vehicle battery under load or that the charging system is operating satisfactorily relative to either battery.

It is a further object of my invention to provide a battery charging system for a boat battery having a continuity indicator to determine the presence of a positive electrical connection between the battery charging system and the electrical system of the boat.

It is also an object of my invention to provide a battery charging system for a boat battery that can be economically fabricated with the control and indicating elements assembled in a compact housing readily attachable to any convenient location within the towing vehicle.

These and other objects and advantages of my invention will be readily apparent from the following detailed description thereof and the accompanying drawings.

In the drawings:

FIGURE 1 is a diagrammatic view in side elevation illustrating a charging system of this invention on a towing vehicle and a boat on a trailer being towed thereby;

FIGURE 2 illustrates the control and indicating elements of the system mounted in a housing attached to the dash of an automobile;

Illustrated in FIGURE 1 is an automobile A towing a trailer T carrying a boat B thereon. The automobile A is provided with an electrical system including a generator 10 for charging the battery 11. The electrical system also includes a voltage regulator 12 interconnected therewith for controlling the charging of the battery 11 and supplying a charging voltage for the charging system of the invention. The boat B is also provided with an electrical system which includes a battery 13.

Figure 3:
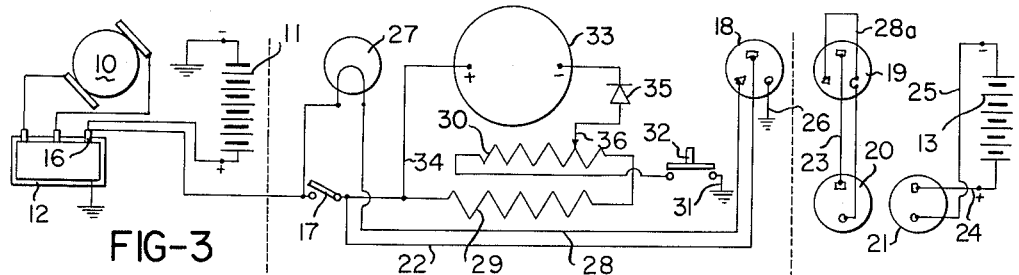
FIGURE 3 is a schematic electrical circuit of the system which is provided when the charging system of the automobile and the electrical system of the boat are of the same voltage.

As shown in FIGURE 2, the control and indicating elements of the battery charging system of this invention are assembled in a housing 14 which may be conveniently mounted on the dashboard D of the automobile. The electrical system of the automobile A also includes a key-operated ignition switch 15. The batteries utilized on the boats and automobiles may be of either the 6- or 12-volt type. When the electrical system of the automobile A and the boat are of the same voltage, either 6- or 12-volt, the battery charging system illustrated in FIGURE 3 is utilized. The battery charging circuit is connected to a terminal 16 of the voltage regulator 12 through a single pole, single throw toggle switch 17. The circuit is also connected to the boat battery 13 through pairs of polarized connectors 18 and 19, and 20 and 21. Connector 18 is mounted on the automobile A and is connected to the charging system. Connector 20 is mounted on the trailer T and connector 19 is connected thereto by a flexible cable. The electrical system of the boat is provided with the connector 21 for interconnection with connector 20. A circuit is completed by interconnecting connectors 18 and 19. The battery 11 of the automobile has the positive pole thereof connected to the terminal 16 of the regulator which is the charging terminal. This charging terminal 16 is connected to the positive terminal of the boat battery 13 by a lead 22 which interconnects the pole of switch 17 with the proper terminal of the connector 18. Connector 18 mates with connector 19 and a lead 23 connects the similar terminal to a terminal of connector 20; a lead 24 connects the positive terminal of battery 13 with a terminal of connector 21 mating with the similar terminal of connector 20. The negative terminal of battery 13 is connected by a lead 25 to a terminal of connector 21 which will complete a circuit through its mating connector 20 to a grounded terminal 26 of connector 18.

A continuity indicator including a pilot lamp 27 is incorporated in the charging circuit to indicate a positive connection of the charging circuit with the electrical system of the boat. One terminal of the lamp 27 is connected to a terminal of switch 17 connected to the voltage regulator 12. The other terminal of the lamp 27 is connected by a lead 28 to a terminal of connector 18. When connectors 18 and 19 are intermeshed, the lamp circuit is completed to the ground terminal 26 by the jumper 28a which interconnects two terminals of connector 19. Thus, the lamp 27 will be illuminated when the pair of connectors 18 and 19 are intermeshed to indicate that the circuit is completed while the boat battery 13 is being charged. At any time that the connectors 18 and 19 should become inadvertently separated, the lamp 27 will not be illuminated to indicate this condition.

Connected to the pole of switch 17 and the lead 22 is a voltage-measuring circuit. The voltage measuring circuit includes a pair of resistors 29 and 30 which are connected in series between the switch 17 and a grounded terminal 31. Also, connected in series with the resistors is a normally open, pushbutton type switch 32. An electrical meter 33 has a positive terminal connected by a lead 34 to a common junction of the resistor 29 and switch 17. The negative terminal of the meter 33 is connected by a diode 35 to an adjustable tap 36 on the resistor 30. An excessive shunt current through the meter 33 to reduce the accuracy of the voltage circuit is prevented by the diode 35.

In the operation of the voltage circuit, the switch 17 will remain open for testing the charged condition of the battery 13. Closing switch 32 will thereby connect the resistors 29 and 30 in circuit with the positive terminals of the battery 13. The meter 33 will then indicate a voltage proportional to the charged condition of the battery 13. It is necessary that the tap 36 be adjusted initially on resistor 30 to accurately calibrate the voltage circuit. The meter 33 is preferably provided with dial markings as illustrated in FIGURE 2. The dial markings provide a convenient indication of a high, medium, or low battery charge.

The voltage circuit may also be utilized to monitor the charging voltage supplied by the automobile electrical system. In this instance, switch 17 will be closed completing a circuit to the battery 13. Assuming that the automobile engine has been started and the generator 10 thereof is operating, a charging current will flow to the battery 13. Closing the switch 32 will connect the voltage circuit to the lead 22 and produce an appropriate indication on the meter 33. The meter 33 is also provided with a dial marking at the upper end of the scale which indicates a properly operating system.

The charging circuit may also be utilized to conveniently determine the charged condition of the automobile battery 11 and the proper operation of the generator 10 and the regulator 12 when the electrical system of the boat is disconnected. This is desirable to avoid overloading of the automobile electrical system when the battery 11 thereof has a low charge. When the automobile engine is stopped and the switch 17 is closed, the closing of switch 32 will connect the voltage circuit to the battery 11 to indicate this charged condition. If the meter indicates the low charge, it would be inadvisable to couple connectors 18 and 19 to the circuit while switch 17 is closed. Also, proper operation of the automobile charging system may be determined by the voltage circuit. When the automobile engine is running, closing switches 17 and 32 will permit the meter 33 to indicate whether the battery 11 is being charged.

Figure 4:
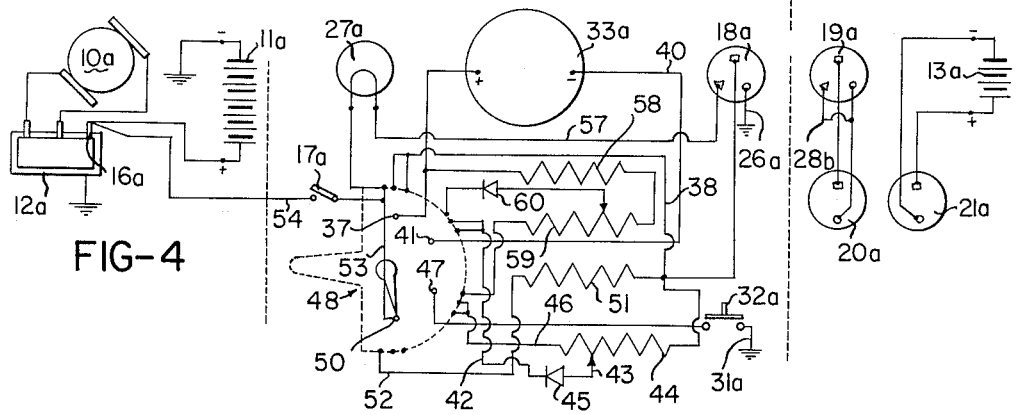
FIGURE 4 is a schematic electrical circuit of the system which is provided when the automobile is provided with a 12-volt charging system and the electrical system of the boat is 6-volt.

In FIGURE 4, a modification of the circuit is illustrated which is utilized when the automobile A is provided with a 12-volt battery 11a and the electrical system of the boat B includes a 6-volt battery 13a. In this circuit, a four-pole, three-position lever switch 48 is connected in the circuit for alternately testing the batteries 11a and 13a. This switch will also be mounted on the housing 14. Assuming that the switch 48 is in a center position, one pole 37 will engage a terminal that is connected by a lead 38 to a terminal of a connector 18a. This terminal will be connected to the positive terminal of battery 13a through its mating connectors 18a and 19a and the pairs of connectors 20a and 21a. The pole 37 of switch 48 is connected to a positive terminal of meter 33a. The negative terminal of meter 33a is connected by a lead 40 to a pole 41 of switch 48. In the center position, the pole 41 engages a terminal connected by a lead 42 to a tap 43 on a resistor 44 through a diode 45. The resistor 44 is connected by a lead 46 to a terminal of switch 48 engaged by a pole 47 thereof. Pole 47 is, in turn, connected to a grounded terminal 31a through a normally open pushbutton switch 32a. The opposite end of resistor 44 is connected to the lead 38. The negative terminal of battery 13a is connected through the connectors 18a through 21a to a ground terminal 26a of connector 18a. Thus, when switch 48 is in a center position, a test circuit similar to that of FIGURE 3 will be completed for determining the charged condition of the boat battery 13a.

To charge the battery 13a, switch 48 will be rotated in a clockwise direction (referring to FIGURE 4) to assume a "right" position. In this position, a pole 50 of switch 48 will engage a terminal connected to a resistor 51 by a lead 52. The opposite end of the resistor 51 is connected to lead 38. The resistor 51 has an ohmic resistance adequate to reduce the 12-volt charging voltage to six volts to charge battery 13a. Pole 50 of switch 48 is connected by leads 53 and 54 to a charging terminal 16a of the regulator 12a through a switch 17a to complete the charging circuit. Assuming that the engine of automobile A is operating, the generator 10a thereof will supply a charging current to the battery 13a through the charging circuit.

The voltage circuit including the meter 33a is also connected in the charging circuit when switch 48 is in its "right" position. Thus, the charging current supplied to the battery 13a will also be monitored. Poles 37, 41 and 47 of switch 48 each engage terminals which are connected to leads 38, 40 and 46 by their respective jumpers. Thus, the meter 33a will indicate the charging voltage supplied by the voltage regulator 12a. It is to be understood, however, that this measurement will be taken at the six volt level rather than the twelve volt.

The pilot lamp 27a has one terminal thereof connected by lead 54 to terminal 16a of the voltage regulator through the switch 17a. The opposite terminal of lamp 27a is connected by a lead 57 to a terminal of connector 18a. When connectors 18a and 19a are intermeshed, the lead 57a is connected to the ground terminal 26a of connector 18a by a jumper 28b interconnecting the appropriate terminals of connector 19a. Lamp 27a will, therefore, not be illuminated unless a good electrical connection is made between the connectors 18a and 19a.

The charging circuit may also be utilized to determine the charged condition of battery 11a and proper operation of the automobile charging circuit. For this purpose, switch 48 will be rotated counterclockwise to a "left" position where the pole 37 engages a terminal connected by lead 54 to the terminal 16a of the regulator. Pole 37 is connected to the positive terminal of meter 33a. Also connected to the pole 37 are a pair of series connected resistors 58 and 59. The series connected resistors 58 and 59 are connected to a terminal of switch 48 which is engaged by a pole 47. Pole 47 completes a circuit to the ground terminal 31a through the pushbutton switch 32a. The negative terminal of the meter 33a connected by lead 40 to pole 41 engages a terminal of switch 48 which is connected to an adjustable tap on resistor 59. A diode 60 is connected in series with this terminal and tap. When switch 48 is in its left position, the 12-volt voltage supplied by the automobile charging circuit will be thus indicated on meter 33a. Assuming that the automobile engine is stopped, the meter will indicate the charge condition of battery 11a. When the automobile engine is operating, the meter will indicate the charging voltage of the automobile circuit.

Figure 5:
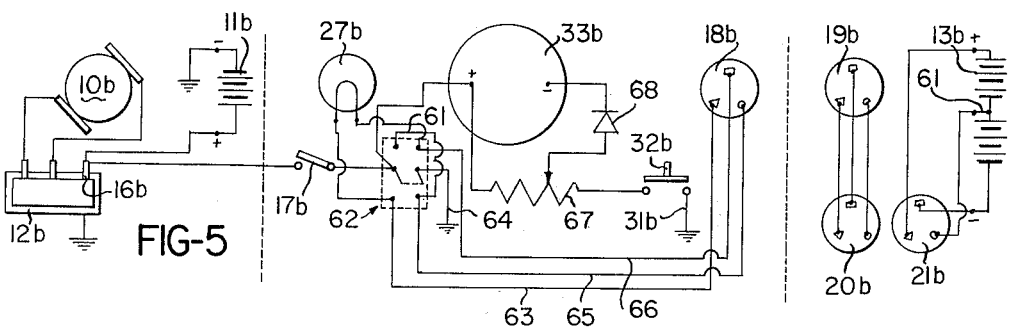
FIGURE 5 is a schematic electrical circuit of the system which is provided when the automobile is provided with a 6-volt charging system and the electrical system of the boat is 12-volt.

FIGURE 5 illustrates schematically a charging circuit which may be utilized when battery 11b is of the 6-volt type and battery 13b on the boat is of the 12-volt type. This circuit is similar to that of FIGURE 3 in its operation but functions to charge only one-half of battery 13b at any particular time. Battery 13b is provided with a center tap 61. The charging terminal 16b of the voltage regulator is connected through a switch 17b to a pole of a double-pole, double-throw switch 62. Switch 62 is also mounted on housing 14 for convenience of operation. For charging battery 13b, a circuit to the battery is completed by a lead 53 interconnecting a terminal of switch 62 to the positive terminal of battery 13b through the connectors 18b, 19b and 20b, 21b. The center tap terminal of battery 13b is also connected to a terminal of switch 62 which may be connected thereby to a ground terminal 64. Thus, when switch 17b is closed and switch 62 is in its downward position, a charging circuit is completed to charge one-half of battery 13b. To charge the other half of battery 13b, switch 62 is placed in an upward position to connect the center tap 61 to the charging terminal 16b through a lead 65. The negative terminal of battery 13b will be connected by a lead 66 to a terminal of switch 62 which will be connected to the ground terminal 64.

The pilot lamp 27b has one terminal thereof connected to the terminal of switch 62 which is connected to the positive terminal of battery 13b through the lead 63. The opposite terminal of the lamp is connected to the terminal of switch 62 which is connected by lead 66 to the negative terminal of battery 13b. This connection requires that a positive electrical connection be made between the connectors 18b and 19b before the lamp 27b would be illuminaed.

The voltage circuit is similar in operation to that of FIGURE 3. The positive terminal of the meter 33b is connected to a pole of switch 62 for connection with either the positive terminal or center tap 61 of battery 13b or to the charging terminal 16b of the voltage regulator through switch 17b. Also connected to the positive terminal of meter 33b is a resistor 67. Resistor 67 may be connected to a ground terminal 31b through a normally open pushbutton switch 32b. The negative terminal of meter 33b is connected through a diode 68 to an adjustable tap on resistor 67. To test the charged condition of battery 13b, switch 17b will be open and switch 62 will be placed in its "down" position or its "up" position to indicate the charge condition of the positive terminal half of battery 13b or the negative terminal half of battery 13b, respectively. In either instance, the positive terminal of meter 33b will be connected to a terminal of battery 13b which will be at a 6-volt potential relative to the ground terminals 64 and 31b. In a similar manner, the charging voltage applied to either half of battery 13b will be indicated by meter 33b when switch 17b is closed. For either test, it will be necessary to close the pushbutton switch 33b.

The charged condition of battery 11b or the charging voltage supplied by the automobile electrical systems may also be determined by this circuit. In this instance, it will be necessary to disconnect the connectors 18b and 19b. Closing of switch 17b will, therefore, connect the voltage circuit to terminal 16b of the voltage regulator and momentarily closing the switch 32b will cause meter 33b to indicate the charge condition of battery 11b for the charging voltage supplied thereto. Which measurement is made is dependent on whether the automobile engine is operating.

Figure 6:
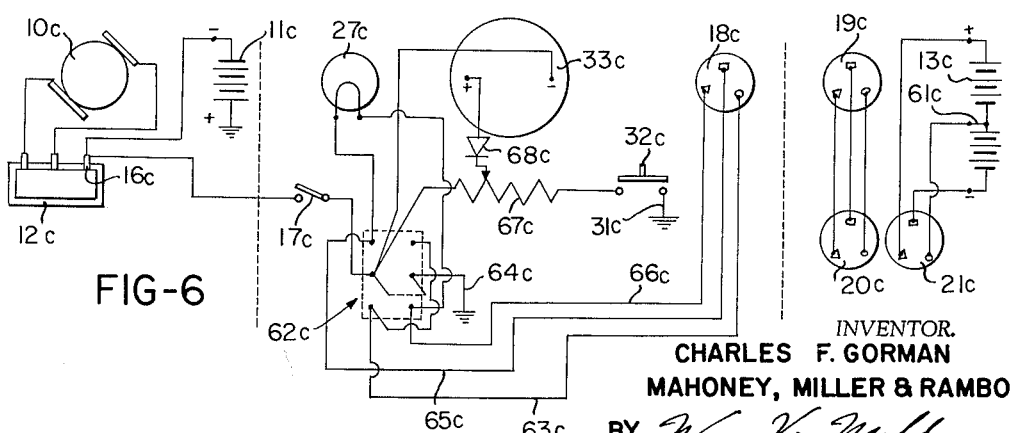
FIGURE 6 is a schematic electrical circuit similar to FIGURE 5 but showing a grounded-positive type system.

In some automobiles, the electrical system is of the grounded positive type such as is illustrated in FIGURE 6. The charging circuit of FIGURE 6 is a modification of that illustrated in FIGURE 5 to charge a 12-volt battery 13c in the boat. It will be noted in this circuit that the battery 11c of the automobile is of the 6-volt type which is charged by a generator 10c through a voltage regulator 12c. The charging circuit is similar to that of FIGURE 5 except that the terminals of meter 33c are reversed in their connection to the circuit through a switch 62c. The circuit is connected by leads 63c, 65c and 66c to the battery 13c, which has a center tap 61c, through the connectors 18c, 19c, 20c and 21c. The voltage circuit also includes a load resistor 67c with a series connected switch 32c for connecting the circuit to a ground terminal 31c. The positive terminal of the meter 33c is connected through a diode 68c to an adjustable top or resistor 67c. The operation of this circuit is similar to that previously described for the circuit of FIGURE 5.

It is readily apparent that the battery charging system of this invention is capable of conveniently charging a boat battery and to determine the charged condition thereof. Utilization of the electrical system of a towing vehicle substantially reduces the cost of a battery charging system for a boat battery and its operation. The charged condition is more accurately determined by the present system as the measurment is made by connecting a load resistor in the circuit which approximates an operating condition for the battery. A determination of the proper operation of the charging system may also be readily accomplished by voltage measuring circuit. Incorporation of a continuity indicator in the charging system assures that the electrical system of the boat remains connected thereto while the towing vehicle and trailer are in transit.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what I claim is:

1. In combination with a towing vehicle provided with an operating electrical system having a generator and a voltage regulator; a battery charging system for an electrical system including a battery to be charged carried by a trailer towed by the vehicle comprising a battery charging circuit for interconnecting the electrical system of a trailer with a terminal of the voltage regulator supplying a battery charging voltage and a ground terminal, and a voltage measuring circuit for determining the charged condition of a battery connected thereto and for alternately determining the charging voltage of the system, said voltage measuring circuit including an electrical load resistance provided with an adjustable tap having a first terminal connected to said charging circuit and a second terminal connected to a grounded terminal of a towing vehicle through a switch means and a meter mechanism for providing a visual indication of the voltage of said charging system, said meter mechanism having a first terminal connected to said first terminal of said resistance and a second terminal connected to the adjustable tap of said resistance, said adjustable tap being positioned on said resistance to provide a meter indication proportional to the voltage of said charging system, said second terminal of said meter mechanism being connected to the adjustable tap of said resistance through a diode.

2. In combination with a towing vehicle provided with an operating electrical system having a generator and a voltage regulator; a battery charging system for an electrical system of a trailer to be towed by the vehicle and including a battery to be charged having a voltage substantially less than that of the electrical system of the towing vehicle comprising a voltage measuring circuit and a charging circuit, said charging circuit including an electrical resistance connected in series with a terminal of said trailer battery for reducing the voltage supplied to said charging system to that required for charging of the trailer battery, and a switch means for alternately connecting said voltage measuring circuit with a trailer battery to determine the charged condition thereof and for connecting said charging circuit to a trailer battery for charging said battery and to said voltage measuring circuit for determining the charging voltage of the system, said voltage measuring circuit including an electrical load resistance provided with an adjustable tap having a first terminal connected to a common terminal of said charging resistance and of a trailer battery and a second terminal connected to a ground terminal through said switch means and a switch contact for momentarily completing a circuit therethrough, and a meter mechanism for providing a visual indication of the voltage of said charging system, said meter mechanism having a first terminal connected by said switch means to said common terminal and a second terminal connected to said adjustable tap by said switch means through a diode, said adjustable tap being positioned on said resistance to provide a meter indication proportional to the voltage of the charging system or of the trailer battery.

3. The combination of claim 2 in which said voltage measuring circuit includes a second electrical load resistance provided with an adjustable tap having a first terminal connected to said first terminal of the meter mechanism and a second terminal connected to said ground terminal through said switch means and said switch contact, said second terminal of the meter being connected to said adjustable tap by said switch means through a diode, said switch means being operable to disconnect said charging circuit from said voltage regulator and to disconnect said first voltage measuring circuit therefrom and to connect said second voltage measuring circuit to said voltage regulator whereby the charged condition of the battery of the towing vehicle may be determined or to determine the charging voltage supplied thereto.

References Cited in the file of this patent

UNITED STATES PATENTS

| | | |
|---|---|---|
| 383,502 | Timmis | May 29, 1888 |
| 2,267,826 | Heyer | Dec. 30, 1941 |
| 2,866,907 | Gebhard | Dec. 30, 1958 |